March 7, 1933.   J. HEUER   1,900,060
TRAFFIC SIGNAL APPARATUS
Filed Nov. 17, 1931   2 Sheets-Sheet 1
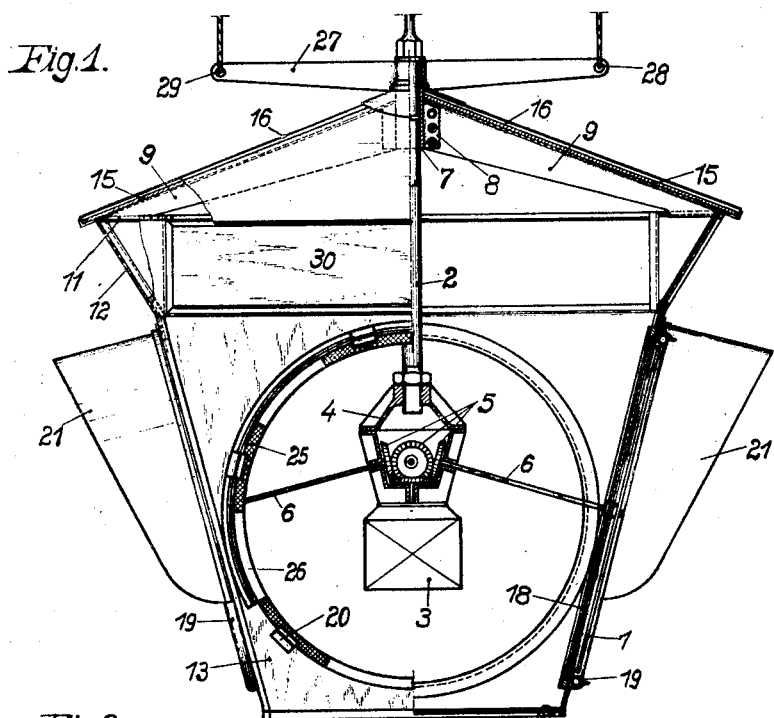
Inventor:
Josef Heuer
By Emil Bonnelycke Attorney March 7, 1933.  J. HEUER  1,900,060
TRAFFIC SIGNAL APPARATUS
Filed Nov. 17, 1931   2 Sheets-Sheet 2
Fig.3.
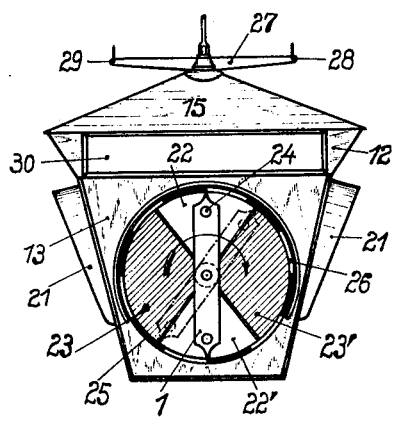
Fig.4.
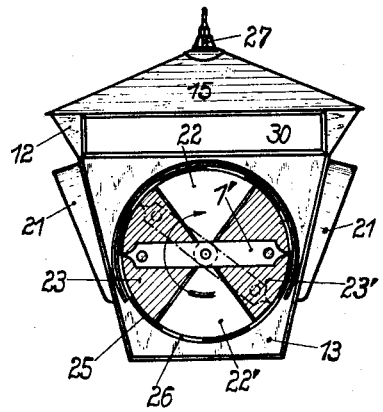
Fig.5.
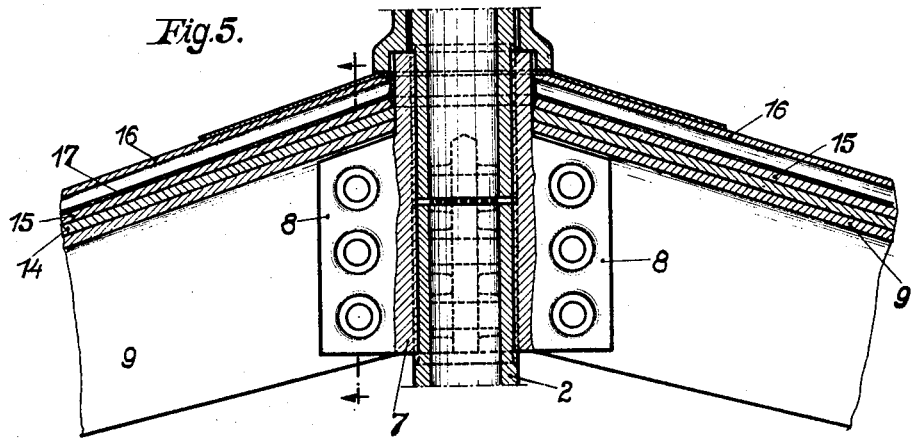
Fig.6.
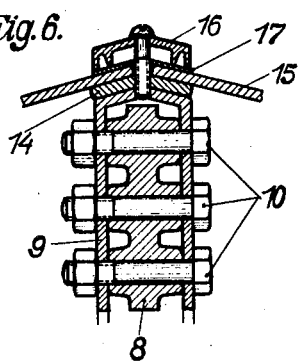
Fig.8.
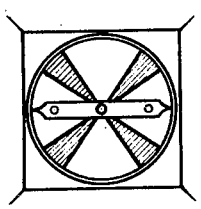
Fig.7.
Inventor:
Josef Heuer
By Emil Bönnelycke
Attorney Patented Mar. 7, 1933

1,900,060

UNITED STATES PATENT OFFICE

JOSEF HEUER, OF GRUNE, GERMANY

TRAFFIC SIGNAL APPARATUS

Application filed November 17, 1931, Serial No. 575,670, and in Germany September 28, 1931.

This invention relates to traffic signal apparatus of the type in which a rotating pointer is used, arranged to indicate "road clear" and "stop" respectively during different portions of its rotation. Generally apparatus of this kind is mounted on a post, or suspended, at street corners, with clock-driven pointers working on discs which face the streets, the length of the pointers being about equal to the radii of the discs.

According to my invention a pointer is used, which is in the form of a double armed beam pivoted at its centre. This beam may work on a disc having a diameter about equal to the length of the beam, the disc having thereon marks or signs for indicating "clear" and "stop", according to the position of the pointer. Such signs may be disposed as to enable a double reading to be obtained, with both pointer arms.

A convenient method is to colour the disc in segments, there being two diametrically opposed segments (as, for instance, green) for indicating "clear" and two diametrically opposed segments (red) for indicating "stop". The red segments may be somewhat larger than the green.

The double armed pointer has the advantage of being visible at longer range, and lends itself well to giving signals by virtue of its position alone, without regard to markings on a disc or dial. With a one armed rotating pointer there must in general be distinctive marks to which the same points, but with the double pointer the vertical position may in itself give a "clear" indication and the horizontal position indicating "stop", in accordance with the customary semaphore practice. There is also the advantage that where distinctive marks are used, generally colored segments on a disc, these may be duplicated, so that both ends of the pointer are effective, and if one end is accidentally obscured from certain points of view the other end affords the signal required. With the double pointer very simple and effective dispositions can be made where it is desirable to have on the disc a larger area of one color than of the other, inasmuch as a symmetrical disposition of color segments may be used.

It may be that at crossroads the traffic is heavier along one line than along the other, in which case the green segments are made larger for the main road, and the green segments for the lighter stream of traffic are correspondingly reduced.

I may use for the signalling apparatus a housing with a pyramid-shaped roof of transparent material, so that daylight may be used for illuminating the translucent discs, instead of having electric light during the daytime. The roof may be supported by four downwardly inclined arms radiating from a central post or tube, which is inside the housing and supports the motor driving the pointers. The said arms may have at the free ends lugs for joining them to corner pieces of stamped metal, supporting the frame of the housing. This is an inexpensive method of construction, largely avoiding internal parts which prevent free illumination of the discs by the light falling through the roof.

The floor of the housing may also have a pointer operating on a colored dial or disc for signalling purposes, there being, say, four green and four smaller red segments, and the pointer serving, in conjunction with the pointers at the sides, to control traffic which is turning right or left at the crossroads.

An example of apparatus according to the invention is shown in the annexed drawings, in which Fig. 1 is an elevation thereof, partly in section, with the front disc removed, and Fig. 2 a plan view;

Figs. 3 and 4 are side views of two adjacent sides of the traffic signal apparatus on a smaller scale.

Figs. 5, 6 and 7 are sectional views of various details on an enlarged scale, and Fig. 8 is a bottom view of the disc and pointer at the bottom of the housing.

The apparatus shown, designed for suspension from a wire or bracket, has four discs, each with a pointer 1 pivoted at the center of the disc. A vertical central tube 2 supports an electromotor 3 for actuating the pointers, 4 being a gear case with bevel gears 5 driving the spindles 6 of the pointers. At the upper end of the tube 2 there is a spider 7 with lugs 8 supporting channelled, inclined arms 9 fixed to the lugs by bolts 10 (Figs. 1, 2, 5 and 6). These arms support a pyramid-shaped roof of glass (for instance reinforced glass) or other transparent material, and are joined by triangular lugs 11 to stamped corner pieces 12. To the latter are fixed the several parts of the frame or casing 13, also of stamped metal. The roof is constructed with particular care. On each arm 9 there is a layer 14 of felt, under the glass 15, and over this is a cover strip 16 with a lead strip 17 between it and the glass.

The four discs 18 are fixed externally to the casing, forwardly inclined at angles of 15° for convenient viewing. This forward inclination also tends to prevent the settling of dust and snow on the discs. At the rim of each disc, outside, there is a tubular spring ring 19 (Fig. 7) of steel, held by a spring 20, and a hood or guard 21 of celluloid or other translucent material is fitted to keep snow from the disc and pointer.

As shown in Figs. 3 and 4 the pointers 1 and 1¹ of two adjacent discs facing in direction at an angle of 90° are at a phase angle of 90° to each other. Each disc has two green fields 22, 22¹ and two red fields 23, 23¹, the latter being slightly larger than the green fields, so that traffic along one road is stopped slightly before the traffic along the other is released, enabling vehicles actually on the crossing at the time of stoppage to clear the crossing before the cross-flow starts. Of course the green fields may if desired be of the same size as the red, and yellow fields may be introduced to indicate intervals during the times of change.

The pointers are preferably white, and of uniform breadth, except at the tapered tips. Near each tip there is a hole 24, through which the color of the field behind the pointer can be perceived, at close range. When the pointer shown in Fig. 3 reaches the position indicated by broken lines it indicates the beginning of a stoppage of traffic from the direction in which the disc faces. At the same time the pointer shown in Fig. 4 is in the position indicated by broken lines, still on a red field, and a short time must elapse before traffic is released from the road which this disc faces.

The ring 19 is marked in sections 25 and 26, black and white respectively, alternating with each other, each section corresponding to a certain period of time.

The housing has a transverse bar 27 at the top, for double suspension at the ends 28, 29 of the bar. This has the advantage of steadying the apparatus and of enabling it to be set accurately and permanently to face the respective roads.

The transparent roof enables artificial light to be dispensed with in day time, but a lamp or lamps must of course be used at night.

The inclined surfaces 30, also of reinforced glass or the like, may be used for road signs or the like, likewise artificially illuminated at night.

Generally speaking it is preferred to make the pointers rotate with uniform speed, but elliptical gearing may be used to accelerate the rotation near the points of transition from red to green. This reduces the risk of error and enables the difference in size between the red and green fields to be made comparatively large.

The floor of the housing may have a disc or dial and a pointer as shown in Fig. 8, with four red sectors, much smaller than the four intervening green sectors, the area of the red sectors being equal to the difference between red and green areas of the side discs. The periods during which the pointer is on the small red sectors are the periods during which through traffic in all directions is stopped. With reference to this dial or disc special regulations for traffic turning right or left may be made, as convenient, such turning being allowed either when the pointer is on the red sectors, or when it is beginning to sweep over the green sectors, or is about to pass off them.

It will be understood that artificial light may be used during the daytime if desired. If daylight is used it may be desirable to provide some indicator or sign which is placed in evidence when the apparatus is not in operation.

What I claim as my invention and desire to secure by Letters Patent of the United States is:—

1. A traffic signal apparatus, comprising a plurality of discs; a double-armed pointer for each disc pivotally mounted from its center point to the center of its disc; and means for slowly rotating the pointers in the same direction, each disc having differently colored sectors corresponding to different traffic periods whereby each period is represented with two diametrically opposite sectors of the same size and color.

2. A traffic signal apparatus comprising a plurality of discs; a double-armed pointer for each disc pivotally mounted from its center point to the center of its disc; and means for slowly rotating the pointers in the same direction, each disc having two diametrically opposite sectors, on an approximately vertical diameter, of the same color and size for through traffic and two diametrically opposite sectors, on an approximately horizontal diameter, of the same color and size for arrested traffic.

3. A traffic signal apparatus according to claim 2, in which the two sectors for the through traffic are green and the two sectors for the arrested traffic are red, and in which means are provided around each disc to visionally indicate periods of time for the sectors.

4. A traffic signal apparatus according to claim 2, in which the sectors to indicate arrested traffic are somewhat larger than the sectors for through traffic.

5. A traffic signal apparatus according to claim 2, in which the sectors on the discs may be adjusted relative to each other and symmetrically relative to the vertical and horizontal diameters of each disc.

6. A traffic signal apparatus comprising a four-sided casing; a disc mounted on each side of the casing; a double-armed pointer for each disc rotatably mounted from the center point thereof to the center of the disc; and means in the casing for slowly rotating the pointers in the same direction, each disc having differently colored sectors corresponding to the different traffic periods whereby each period is represented with two diametrically opposite sectors of the same size and color.

In testimony whereof I affix my signature.

JOSEF HEUER.